(12) United States Patent
Kajiya et al.

(10) Patent No.: US 7,092,643 B2
(45) Date of Patent: Aug. 15, 2006

(54) OPTICAL TRANSMISSION APPARATUS AND BIAS VOLTAGE CONTROL METHOD FOR THE OPTICAL MODULATOR

(75) Inventors: Satoshi Kajiya, Tokyo (JP); Kazuyuki Ishida, Tokyo (JP); Katsuhiro Shimizu, Tokyo (JP); Yukio Kobayashi, Tokyo (JP)

(73) Assignee: Mitsubishi Denki Kabushiki Kaisha, Tokyo (*) Notice: Subject to any disclaimer, the term of this patent is extended or adjusted under 35 U.S.C. 154(b) by 592 days.

(21) Appl. No.: 09/892,918

(22) Filed: Jun. 28, 2001

(65) Prior Publication Data

US 2002/0001116 A1    Jan. 3, 2002

(30) Foreign Application Priority Data

Jun. 30, 2000  (JP) .............................. 2000-199898

(51) Int. Cl.
- H04B 10/04 (2006.01)
- H04B 10/12 (2006.01)
- G02B 26/00 (2006.01)
- G02F 1/01 (2006.01)
- G02F 1/23 (2006.01)

(52) U.S. Cl. ................. 398/198; 398/183; 398/186; 359/276; 359/278; 359/239

(58) Field of Classification Search ............... 398/183, 398/185, 186, 189, 192, 195, 197, 198; 359/279, 359/276, 278, 239
See application file for complete search history.

(56) References Cited

U.S. PATENT DOCUMENTS 5,557,648 A * 9/1996 Ishihara ............... 375/376
6,229,632 B1 * 5/2001 Jabr ........................ 398/183
6,236,488 B1   5/2001 Shimizu et al.
6,362,913 B1 * 3/2002 Ooi et al. .................. 359/245
6,559,996 B1 * 5/2003 Miyamoto et al. ......... 398/183

FOREIGN PATENT DOCUMENTS

| EP | 1 004 920 A2 | 5/2000 |
|----|--------------|--------|
| JP | A5-142504 | 6/1993 |
| JP | A8-278224 | 10/1996 |
| JP | 10-115813 (A) | 5/1998 |
| JP | A2000-056279 | 2/2000 |
| JP | 2000-89176 (A) | 3/2000 |

* cited by examiner

Primary Examiner—M. R. Sedighian
Assistant Examiner—Nathan Curs
(74) Attorney, Agent, or Firm—Birch, Stewart, Kolasch & Birch, LLP

(57) ABSTRACT

The optical transmission apparatus has a Mach-Zehnder optical modulator, a light source for applying an optical signal of a continuous light to the optical modulator, a driving circuit for inputting a driving signal into the optical modulator, a branching filter for taking out a part of an output optical signal, a photodiode for converting the taken-out output optical signal into an electric signal, a band pass filter for extracting a frequency component of a driving signal included in this electric signal, an error signal generator circuit for generating an error signal of a bias voltage that minimizes a value of the extracted frequency component, and a bias voltage control circuit for applying a bias voltage added with this error signal to the optical modulator.

12 Claims, 15 Drawing Sheets

OPTICAL TRANSMISSION APPARATUS AND BIAS VOLTAGE CONTROL METHOD FOR THE OPTICAL MODULATOR

FIELD OF THE INVENTION

This invention relates to an external modulation type optical transmission apparatus that is used in an optical communication system, and a bias voltage control method for an optical modulator used for this apparatus. Particularly, this invention relates to an optical transmission apparatus using a Mach-Zehnder optical modulator and a bias voltage control method for an optical modulator used for this apparatus.

BACKGROUND OF THE INVENTION

Conventionally, in an optical communication system, there has been used a direct modulation system that generates an optical modulation signal based on a driving current to a laser diode and obtains a light intensity signal that is proportional to an electric signal of the driving current. However, in a super-high-speed broadband optical communication system having a transmission speed that exceeds a few G bits/s, a chirping occurs in which an optical wavelength changes during a direct modulation. This chirping limits the transmission capacity.

In the mean time, according to the external modulation system, there occurs little chirping, and it is possible to modulate relatively easily in an operation band of 10 GHz or above. Therefore, the external modulation system has come to be applied to a super-high-speed broadband large-capacity optical communication system. One of the most general optical modulators as an external modulator, is a Mach-Zehnder optical modulator that uses lithiumniobate ($LiNbO_3$).

An output optical signal I(t) obtained by modulation based on a modulation signal S(t) using this Mach-Zehnder optical modulator is expressed by the following equation (1).

$$I(t)=k\{1+\cos(\beta*S(t)+\delta)\} \quad (1)$$

where, "k" represents a proportional coefficient, "$\beta$" represent a modulation factor, and "$\delta$" represents a phase of an operation point of a Mach-Zehnder optical modulator.

Assume that the modulation signal S(t) is a two-value digital signal, the modulation factor $\beta$ is set as $\beta=\pi$, a suitable DC voltage (bias voltage) is applied to the Mach-Zehnder optical modulator, and an initial phase $\delta$ is set as $\delta=\pi/2$. Then, the Mach-Zehnder optical modulator outputs the output optical signal I(t) that is turned ON/OFF in proportion to the modulation signal S(t).

Next, assume that the modulation factor $\beta$ is set as $\beta=2\pi$, a suitable bias voltage is applied to the Mach-Zehnder optical modulator, and an initial phase $\delta$ is set as $\delta=0$. Further, a sinusoidal wave of a repetitive frequency fc is input as the modulation signal S(t). Then, the output optical signal I(t) can be expressed by the following equation (2).

$$I(t)=k\{1+\cos(2\pi*\sin(2\pi fc(t)))\} \quad (2)$$

Therefore, the output optical signal I(t) shown by the equation (2) is output as an optical signal that is turned ON/OFF in the repetitive frequency 2fc that is two times the repetitive frequency fc.

In this case, although there is no problem when the value of the phase $\delta$ is constant, an optical modulator that uses a normal lithium niobate has a problem in that the operation point drifts. This drift includes two types: a thermal drift due to a pyroelectric effect that is brought about by a temperature change; and a DC drift that is generated by a charge distribution that is formed on the surface of elements of the optical modulator by the bias voltage applied to the electrode of the optical modulator. In order to compensate for the change in the operation point due to these drifts, it is necessary to apply a bias voltage to the optical modulator to obtain an optimum operation point.

FIG. 12 is a block diagram showing a structure of a conventional optical transmission apparatus capable of stabilizing a bias voltage applied to the optical modulator that uses this lithium niobate (refer to Japanese Patent Application Laid-Open No. 5-142504). In FIG. 12, a continuous light emitted from a light source 101 is input into a Mach-Zehnder optical modulator 103 that uses lithium niobate. A terminating unit 114 is connected to the Mach-Zehnder optical modulator 103. Further, a driving signal for driving the Mach-Zehnder optical modulator 103 and a bias voltage are applied to the Mach-Zehnder optical modulator via a node T1.

An output optical signal modulatedby the Mach-Zehnder optical modulator 103 is output to an output terminal 120 via a branching filter 104. At the same time, a part of the output optical signal is input into a photodiode 105. The photodiode 105 converts the input part of the output optical signal into an electric signal, and a preamplifier 106 amplifies this electric signal, and outputs a result to a synchronous detector circuit 107.

The synchronous detector circuit 107 carries out a synchronous detection of the electric signal input from the preamplifier 106 and a low-frequency signal output from a dither signal generator 112. The synchronous detector circuit 107 has a mixer 117, and mixes the electric signal input from the preamplifier 106 and the low-frequency signal output from the dither signal generator 112. The mixed signal is input into a low-pass transmission filter 109 via an operational amplifier 108. The low-pass transmitted signal is output to a bias voltage control circuit 110.

The bias voltage control circuit 110 has a DC power source 118 and an adder 119. The adder 119 adds a signal output from the synchronous detector circuit 107 and a bias voltage output from the DC power source 118 together, and outputs an added result as a bias voltage to the Mach-Zehnder optical modulator 103 from the node T1 via an inductor 111. On the other hand, a driving signal is input from an input terminal 121, and is output to a low-frequency superimposing circuit 113 via a driving circuit 124. The low-frequency superimposing circuit 113 superimposes the input driving signal and the low-frequency signal output from the dither signal generator 112 together, and applies a superimposed result as a driving signal to the Mach-Zehnder optical modulator 103 from the node T1 via a capacitor. Therefore, both the driving signal that has been superimposed with the low-frequency signal and the bias voltage that has been bias-voltage controlled are applied to the Mach-Zehnder optical modulator 103 from the node T1.

A method of bias-voltage controlling the Mach-Zehnder optical modulator according to a conventional optical transmission apparatus will be explained below with reference to FIG. 13 to FIG. 15. FIG. 13 is a diagram for explaining a modulation operation of the Mach-Zehnder optical modulator 103 when the bias voltage (phase $\delta$) is at a proper value. In FIG. 13, a performance characteristic curve 130 of the Mach-Zehnder optical modulator 103 shows a performance characteristic curve shown in the equation (1). This shows a state that the bias voltage (phase δ) has been set to a proper value. In this case, when a driving signal (an input signal) 131 superimposed with a low-frequency signal has been input into the Mach-Zehnder optical modulator 103, the driving signal 131 is modulated by the performance characteristic curve 130, and the modulated signal is output as an output optical signal 132. This output optical signal 132 does not include a low-frequency component (f [Hz]) of the low-frequency signal superimposed with the driving signal. A low-frequency component (2 f [Hz]) that is two times the low-frequency component (f [Hz]) is generated in this output optical signal 132. Therefore, the photodiode 105 receives a part of the output optical signal 132, and the preamplifier 106 amplifies this result. Thereafter, the synchronous detector circuit 107 carries out a synchronous detection. As a result, the output of the signal becomes "0". In this case, there is no signal component to be added by the adder 119 of the bias voltage control circuit 110. Therefore, the current bias voltage is maintained as it is, and this bias voltage is applied to the Mach-Zehnder optical modulator 103.

On the other hand, FIG. 14 is a diagram for explaining a modulation operation of the Mach-Zehnder optical modulator 103 when the bias voltage is at a value slightly higher than a proper value. In FIG. 14, a performance characteristic curve 140 of the Mach-Zehnder optical modulator 103 shows a state that the bias voltage has been set to a value slightly higher than a proper value. In this case, when a driving signal 141 that is the same as the driving signal 131 superimposed with a low-frequency signal has been input into the Mach-Zehnder optical modulator 103, the driving signal 141 is modulated by the performance characteristic curve 140, and the modulated signal is output as an output optical signal 142. This output optical signal 142 includes a low-frequency component (f [Hz]) of the low-frequency signal superimposed with the driving signal. The phase of this low-frequency component (f [Hz]) has been inverted from the phase of the low-frequency component (f [Hz]) that has been superimposed with the driving signal. Therefore, the synchronous detector circuit 107 carries out a synchronous detection of the low-frequency component (f [Hz]), and outputs a result to the bias voltage control circuit 110 as a "negative" voltage. In this case, the adder 119 of the bias voltage control circuit 110 adds the negative voltage to the bias voltage output from the DC power source 118, and controls the current bias voltage to become close to the proper value of the bias voltage, by making the current bias voltage smaller.

Further, FIG. 15 is a diagram for explaining a modulation operation of the Mach-Zehnder optical modulator 103 when the bias voltage is at a value slightly lower than a proper value. In FIG. 15, a performance characteristic curve 150 of the Mach-Zehnder optical modulator 103 shows a state that the bias voltage has been set to a value slightly lower than a proper value. In this case, when a driving signal 151 that is the same as the driving signal 131 superimposed with a low-frequency signal has been input into the Mach-Zehnder optical modulator 103, the driving signal 151 is modulated by the performance characteristic curve 150, and the modulated signal is output as an output optical signal 152. This output optical signal 152 includes a low-frequency component (f [Hz]) of the low-frequency signal superimposed with the driving signal. The phase of this low-frequency component (f [Hz]) coincides with the phase of the low-frequency component (f [Hz]) that has been superimposed with the driving signal. Therefore, the synchronous detector circuit 107 carries out a synchronous detection of the low-frequency component (f [Hz]), and outputs a result to the bias voltage control circuit 110 as a "positive" voltage. In this case, the adder 119 of the bias voltage control circuit 110 adds the positive voltage to the bias voltage output from the DC power source 118, and controls the current bias voltage to become close to the proper value of the bias voltage, by making the current bias voltage larger.

As explained above, according to the bias voltage control for controlling a bias voltage applied to the Mach-Zehnder optical modulator of the conventional optical transmission apparatus, a part of the output optical signal output from the Mach-Zehnder optical modulator 103 is detected. The synchronous detector circuit 107 generates an error signal corresponding to a deviation of the bias voltage from an optimum operation point. The bias voltage control circuit 110 controls the bias voltage so that this error signal becomes smaller, thereby maintaining a stable bias voltage.

According to the bias voltage control for controlling a bias voltage applied to the Mach-Zehnder optical modulator 103 of the conventional optical transmission apparatus, a low-frequency signal is superimposed with the driving signal. However, the low-frequency superimposing circuit 113 for superimposing this low-frequency signal with the driving signal uses devices like a voltage control attenuator and a voltage control variable gain amplifier not shown. Therefore, when the band of the driving signal becomes 10 GHz or above, the operation band for these devices becomes in shortage, and a waveform distortion is generated in the driving signal to be applied to the Mach-Zehnder optical modulator 103. As a result, there has been a problem of an occurrence of quality degradation in the output optical signal.

Further, when the band of the driving signal becomes 20 GHz or above, the operation band of the driving circuit 124 becomes in shortage, and thus the driving circuit 124 generates a waveform distortion in the driving signal. As a result, there has been a problem of an occurrence of quality degradation in the output optical signal.

The conventional optical transmission apparatus has obtained an optical output that is proportional to the repetitive frequency fc of the driving signal. However, it has been desired that it is also possible to control the stability of the bias voltage of the Mach-Zehnder optical modulator for an optical transmission apparatus that outputs an output optical signal having the repetitive frequency 2 fc that is two times the repetitive frequency fc of the driving signal.

SUMMARY OF THE INVENTION

It is an object of this invention to obtain an optical transmission apparatus and a bias voltage control method for an optical modulator to be used for this apparatus, capable of easily controlling the stability of the bias voltage, using the repetitive frequency fc as sufficient for the driving signal, with the repetitive frequency 2 fc for the output signal light.

According to one aspect of this invention, a part of an optical signal output from the optical modulator is taken out and that part of the optical signal is converted into electric signal, a frequency component of the driving signal is extracted from the obtained electric signal, an error signal of a bias voltage for minimizing a value of the frequency component of the driving signal is generated, and a bias voltage obtained as a result of addition of the bias voltage and a voltage corresponding to the error signal is applied to the optical modulator.

According to another aspect of this invention, a part of an optical signal output from the optical modulator is taken out, and this part of the optical signal is converted into an electric signal, a frequency component two times that of the driving signal from the obtained electric signal is extracted, an error signal of a bias voltage for maximizing a value of the frequency component two times that of the driving signal extracted at the extracting step is generated, a bias voltage obtained as a result of addition of the bias voltage and a voltage corresponding to the error signal is applied to the optical modulator.

Other objects and features of this invention will become apparent from the following description with reference to the accompanying drawings.

DESCRIPTION OF THE PREFERRED EMBODIMENTS

Preferred embodiments of the optical transmission apparatus and a bias voltage control method of an optical modulator to be used for this apparatus relating to this invention will be explained in detail below with reference to the accompanying drawings.

Figure 1:
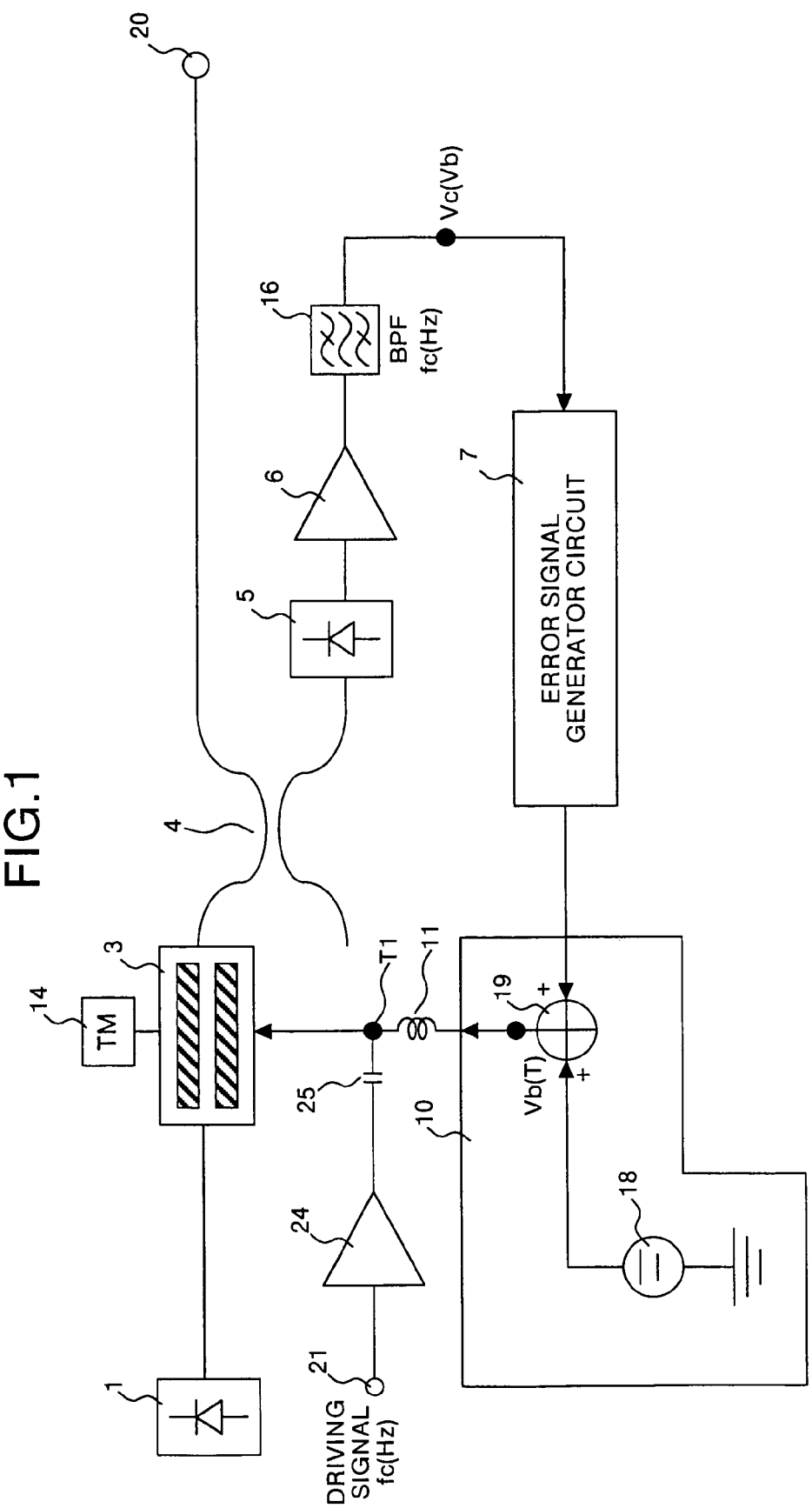
FIG. 1 is a block diagram showing a structure of an optical transmission apparatus according to a first embodiment of this invention.

FIG. 1 is a block diagram showing a structure of an optical transmission apparatus according to a first embodiment of this invention. Continuous light emitted from a light source 1 is input into Mach-Zehnder optical modulator 3 that uses lithium niobate. Terminating unit 14 is connected to the Mach-Zehnder optical modulator 3. Driving signal (fc [Hz]) for driving the Mach-Zehnder optical modulator 3 and a bias voltage are applied to the Mach-Zehnder optical modulator 3 via node T1.

An output optical signal modulated by the Mach-Zehnder optical modulator 3 is output to an output terminal 20 via a branching filter 4. A part of the output optical signal is input into photodiode 5. The photodiode 5 converts the input part of the output optical signal into an electric signal, and inputs a converted result to a preamplifier 6. The preamplifier 6 amplifies this electric signal, and inputs the amplified result to a band pass filter 16. The band pass filter 16 selectively transmits a frequency component fc included in the input electric signal, and outputs this frequency fc component to an error signal generator circuit 7. The error signal generator circuit 7 detects a level of the frequency component fc transmitted through the band pass filter 16, generates an error signal that shows an error of the bias voltage based on this detection value, and outputs this error signal to a bias voltage control circuit 10.

The bias voltage control circuit 10 has a DC power source 18 and an adder 19. The adder 19 adds a signal output from the error signal generator circuit 7 and an error signal output from the DC power source 18 together, and outputs an added result as a bias voltage to the Mach-Zehnder optical modulator 3 from the node T1 via an inductor 11. In the mean time, a driving signal is input from an input terminal 21, and is applied as the driving signal to the Mach-Zehnder optical modulator 3 from the node T1 via a driving circuit 24 and a capacitor 25. Therefore, the driving signal of the frequency fc component and the bias-voltage-controlled bias voltage are applied to the Mach-Zehnder optical modulator 3 from the node T1. It is preferable that the photodiode 5 can receive the frequency fc component, and that the preamplifier 6 has a sufficient band capable of amplifying the frequency fc component.

Figure 2A:
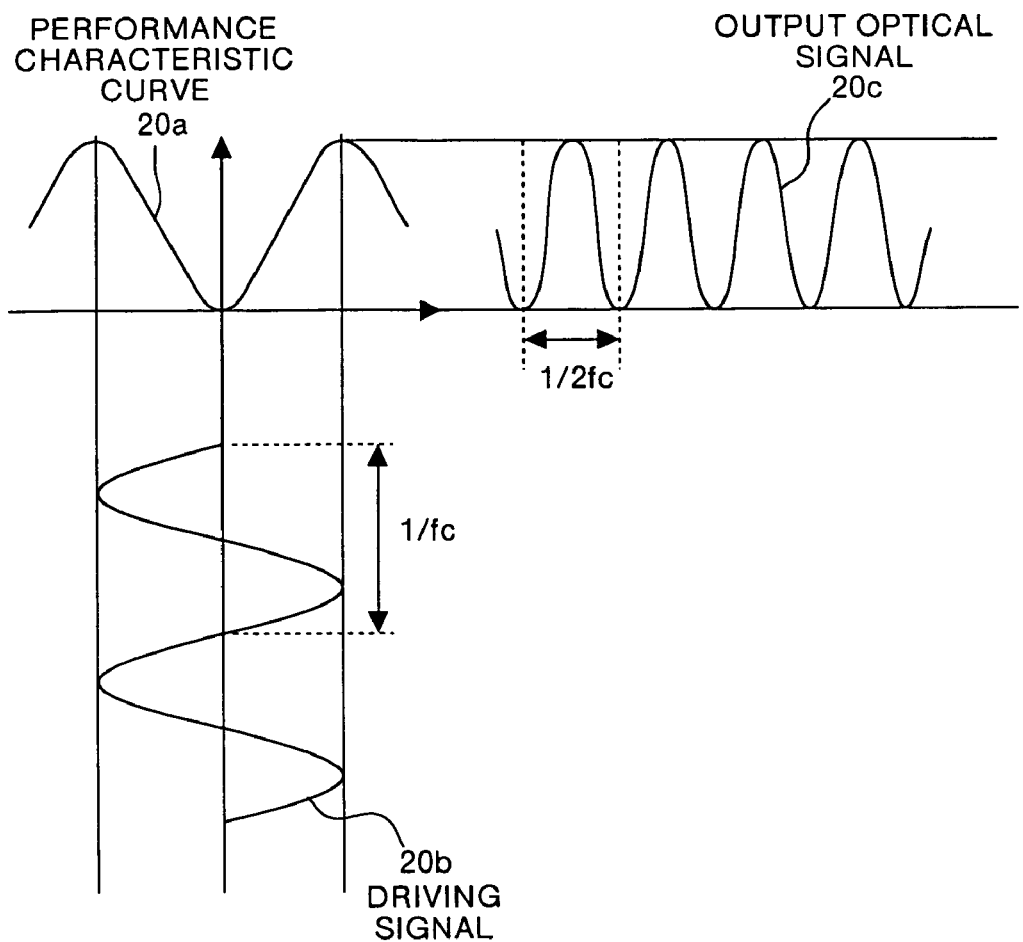
FIG. 2A shows a relationship between a driving signal input into a Mach-Zehnder optical modulator and an output optical signal.
Figure 2B:
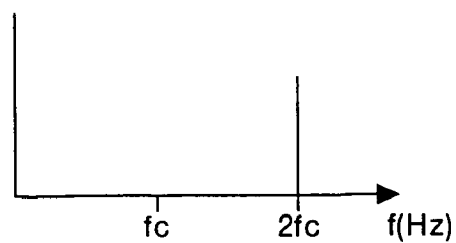
FIG. 2B is a diagram showing a spectrum distribution of an output optical signal detected by a photodiode, when the bias voltage is at a proper value.

A bias voltage control of the Mach-Zehnder optical modulator 3 by the optical transmission apparatus shown in FIG. 1 will be explained below with reference to FIG. 2A to FIG. 4B. FIG. 2A and FIG. 2B are diagrams for explaining a modulation operation by the Mach-Zehnder optical modulator 3 when the bias voltage (phase δ) is at a proper value. FIG. 2A shows a relationship between a driving signal input into the Mach-Zehnder optical modulator 3 and an output optical signal, and FIG. 2B is a diagram showing a spectrum distribution of an output optical signal detected by the photodiode 5.

Performance characteristic curve 20a of the Mach-Zehnder optical modulator 3 is obtained through the equation (1), and this shows a status that the bias voltage (phase δ) has been set properly. In this case, the modulation factor β is set as δ=2π, and the initial phase δ is set as δ=0 corresponding to the equation (2). The Mach-Zehnder optical modulator 3 outputs an output optical signal 20c having a repetitive frequency 2 fc [Hz] that is two times the repetitive frequency fc [Hz] by a driving signal 20b of the repetitive frequency fc [Hz].

The branching filter 4 branches a part of the output optical signal 20c, and outputs a result to the photodiode The signal detected and converted into an electric signal by the photodiode 5 is input into the preamplifier 6. The signal amplified by the preamplifier 6 is input into the band pass filter 16. The band pass filter 16 transmits only the repetitive frequency fc component corresponding to the driving signal 20b included in the output optical signal 20c, and outputs this frequency component to the error signal generator circuit 7.

As shown in FIG. 2B, the spectrum of the output optical signal does not include the frequency fc component, and includes only the frequency 2 fc component. As a result, the value of the signal output from the band pass filter 16 becomes "0". The error signal generator circuit 7 generates an error signal based on the value of the signal of the band pass filter 16. In this case, as this value is "0", the value of the error signal output from the error signal generator circuit 7 also becomes "0". As a result, the bias voltage control circuit 10 applies the bias voltage, that is the current maintained bias voltage, to the Mach-Zehnder optical modulator 3 via the inductor 11 and the node T1.

Figure 3A:
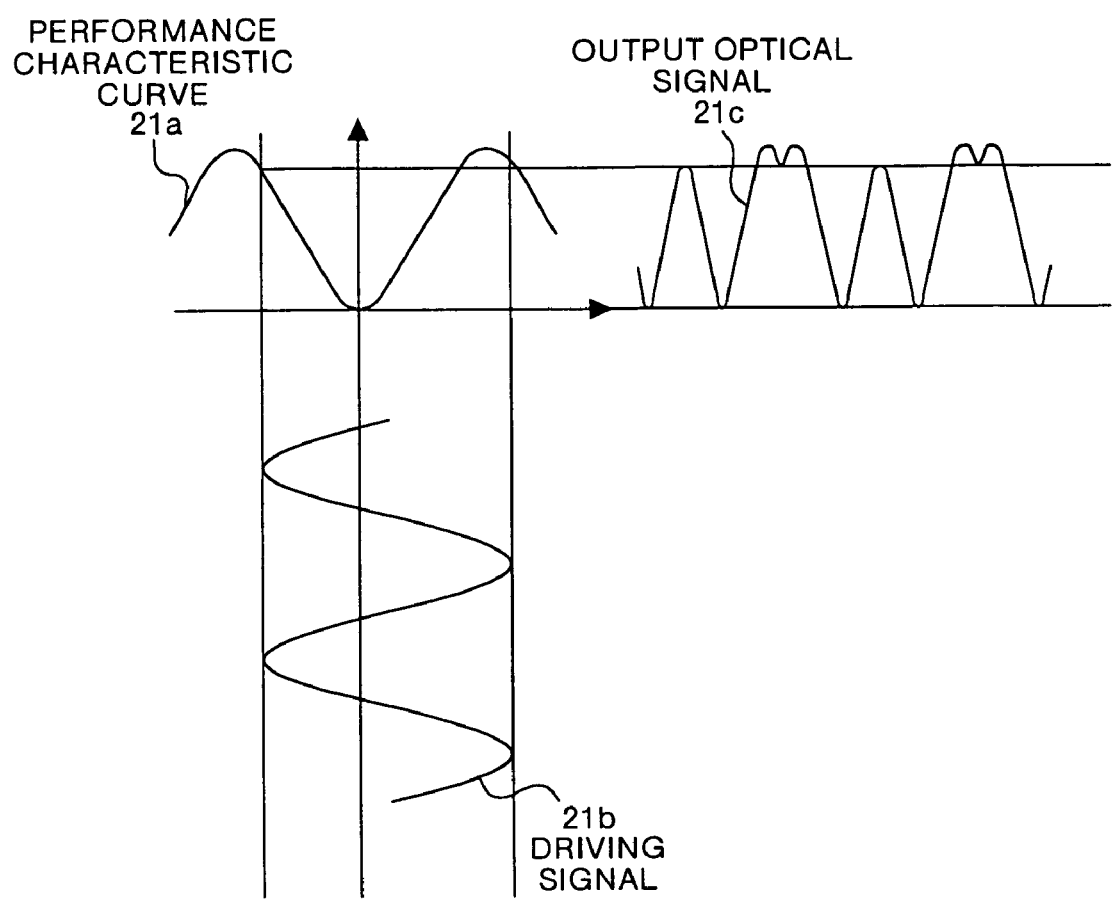
FIG. 3A shows a relationship between a driving signal input into a Mach-Zehnder optical modulator and an output optical signal.
Figure 3B:
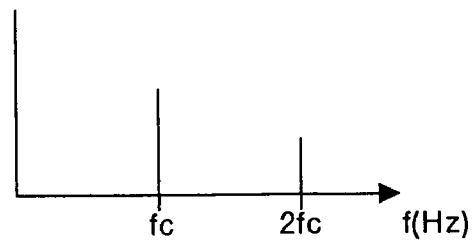
FIG. 3B is a diagram showing a spectrum distribution of an output optical signal detected by a photodiode, when the bias voltage is slightly higher than the proper value.

FIG. 3A and FIG. 3B are diagrams for explaining a modulation operation of the Mach-Zehnder optical modulator 3 when the bias voltage applied to the Mach-Zehnder optical modulator 3 is at a value slightly higher than the proper value. FIG. 3A shows a relationship between a driving signal input into the Mach-Zehnder optical modulator 3 and an output optical signal, and FIG. 3B is a diagram showing a spectrum distribution of an output optical signal detected by the photodiode 5. Performance characteristic curve 21a of the Mach-Zehnder optical modulator 3 is in a status that the bias voltage has been set to a value slightly higher than that of the performance characteristic curve 20a shown in FIG. 2A.

The branching filter 4 branches a part of an output optical signal 21c, and outputs a result to the photodiode 5. The signal detected and converted into an electric signal by the photodiode 5 is input into the preamplifier 6. The signal amplified by the preamplifier 6 is input into the band pass filter 16. The band pass filter 16 transmits only the repetitive frequency fc component corresponding to a driving signal 21b included in the output optical signal 21c, and outputs this frequency component to the error signal generator circuit 7.

As shown in FIG. 3B, the spectrum of the output optical signal includes the frequency fc component, and also includes the frequency 2 fc component. As a result, the value of the frequency fc component is output to the error signal generator circuit 7 from the band pass filter 16. The error signal generator circuit 7 generates an error signal corresponding to the value of the signal of the band pass filter 16, and outputs the error signal to the adder 19 of the bias voltage control circuit 10. The adder 19 adds the error signal to the bias voltage that is input from the DC power source 18, and applies this added bias voltage to the Mach-Zehnder optical modulator 3 via the inductor 11 and the node T1. As a result, the operation point of the Mach-Zehnder optical modulator 3 comes close to an optimum operation point.

Figure 4A:
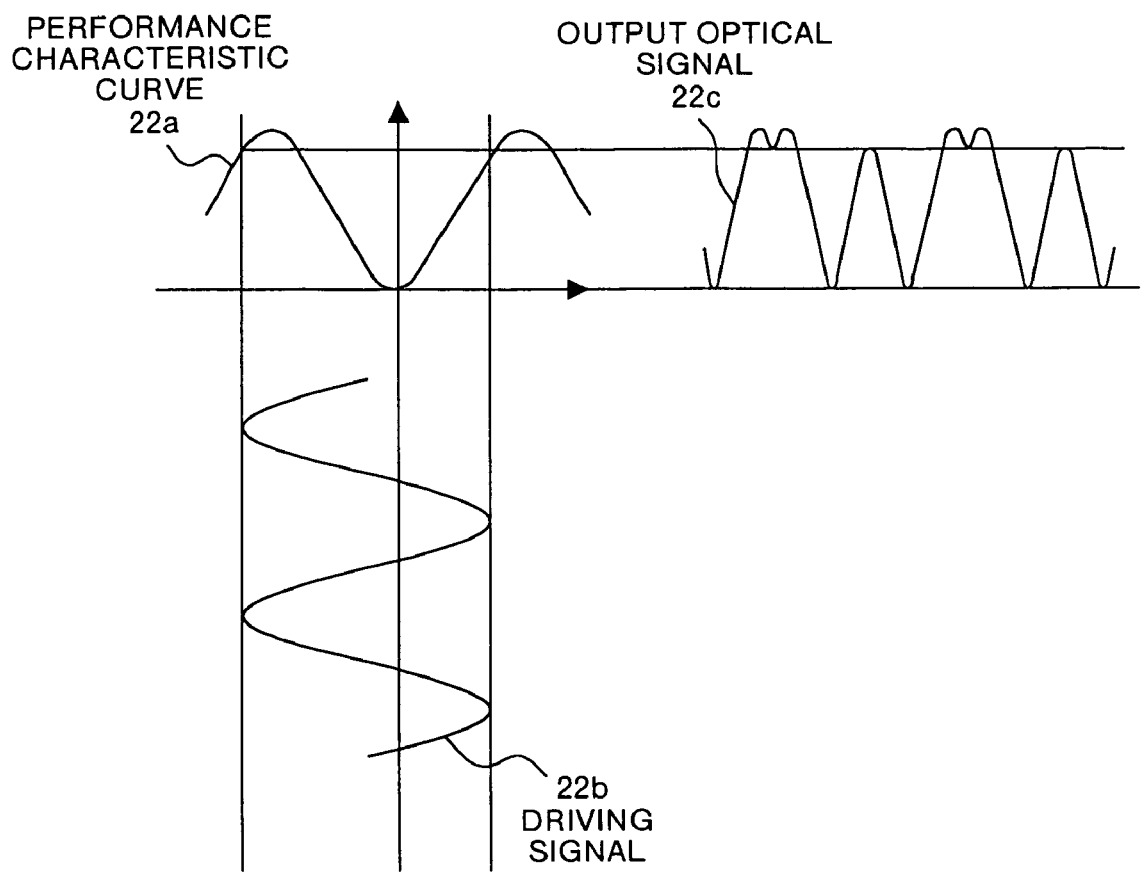
FIG. 4A shows a relationship between a driving signal input into a Mach-Zehnder optical modulator and an output optical signal.
Figure 4B:
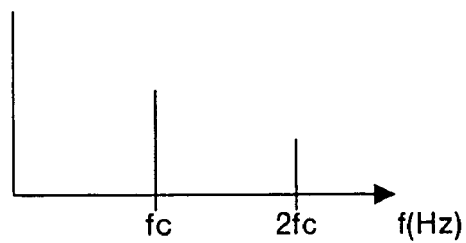
FIG. 4B is a diagram showing a spectrum distribution of an output optical signal detected by a photodiode, when the bias voltage is slightly lower than the proper value.

FIG. 4A and FIG. 4B are diagrams for explaining a modulation operation of the Mach-Zehnder optical modulator 3 when the bias voltage applied to the Mach-Zehnder optical modulator 3 is at a value slightly lower than the proper value. FIG. 4A shows a relationship between a driving signal input into the Mach-Zehnder optical modulator 3 and an output optical signal, and FIG. 4B is a diagram showing a spectrum distribution of an output optical signal detected by the photodiode 5. Performance characteristic curve 22a of the Mach-Zehnder optical modulator 3 is in a status that the bias voltage has been set to a value slightly lower than that of the performance characteristic curve 20a shown in FIG. 2A.

The branching filter 4 branches a part of an output optical signal 22c, and outputs a result to the photodiode 5. The signal detected and converted into an electric signal by the photodiode 5 is input into the preamplifier 6. The signal amplified by the preamplifier 6 is input into the band pass filter 16. The band pass filter 16 transmits only the repetitive frequency fc component corresponding to a driving signal 22b included in the output optical signal 22c, and outputs this frequency component to the error signal generator circuit 7.

As shown in FIG. 4B, the spectrum of the output optical signal includes the frequency fc component, and also includes the frequency 2 fc component. As a result, the value of the frequency fc component is output to the error signal generator circuit 7 from the band pass filter 16. The error signal generator circuit 7 generates an error signal corresponding to the value of the signal of the band pass filter 16, and outputs the error signal to the adder 19 of the bias voltage control circuit 10. The adder 19 adds the error signal to the bias voltage that is input from the DC power source 18, and applies this added bias voltage to the Mach-Zehnder optical modulator 3 via the inductor 11 and the node T1. As a result, the operation point of the Mach-Zehnder optical modulator 3 comes close to an optimum operation point.

Figure 5:
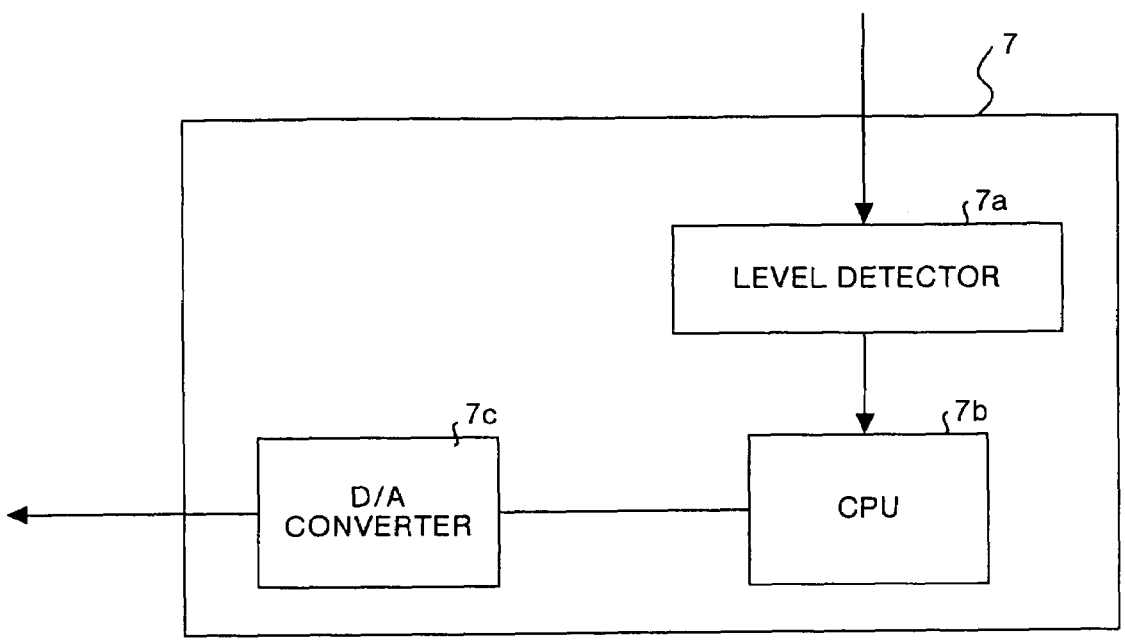
FIG. 5 is a block diagram showing a detailed structure of an error signal generator circuit shown in FIG. 1.

A structure and a processing of the error signal generator circuit 7 will be explained. FIG. 5 is a block diagram showing a structure of the error signal generator circuit 7 shown in FIG. 1. Level detector 7a detects a level of the frequency fc component input from the bandpass filter 16, and outputs this frequency component to a CPU 7b. The CPU 7b generates an error signal based on a result of the level detection by the level detector 7a, and outputs this error signal to a D/A converter 7c. The D/A converter 7c converts the digital error signal output from the CPU 7b into an analog error signal, and outputs this analog error signal as the error signal to the adder 19 of the bias voltage control circuit 10.

Figure 6:
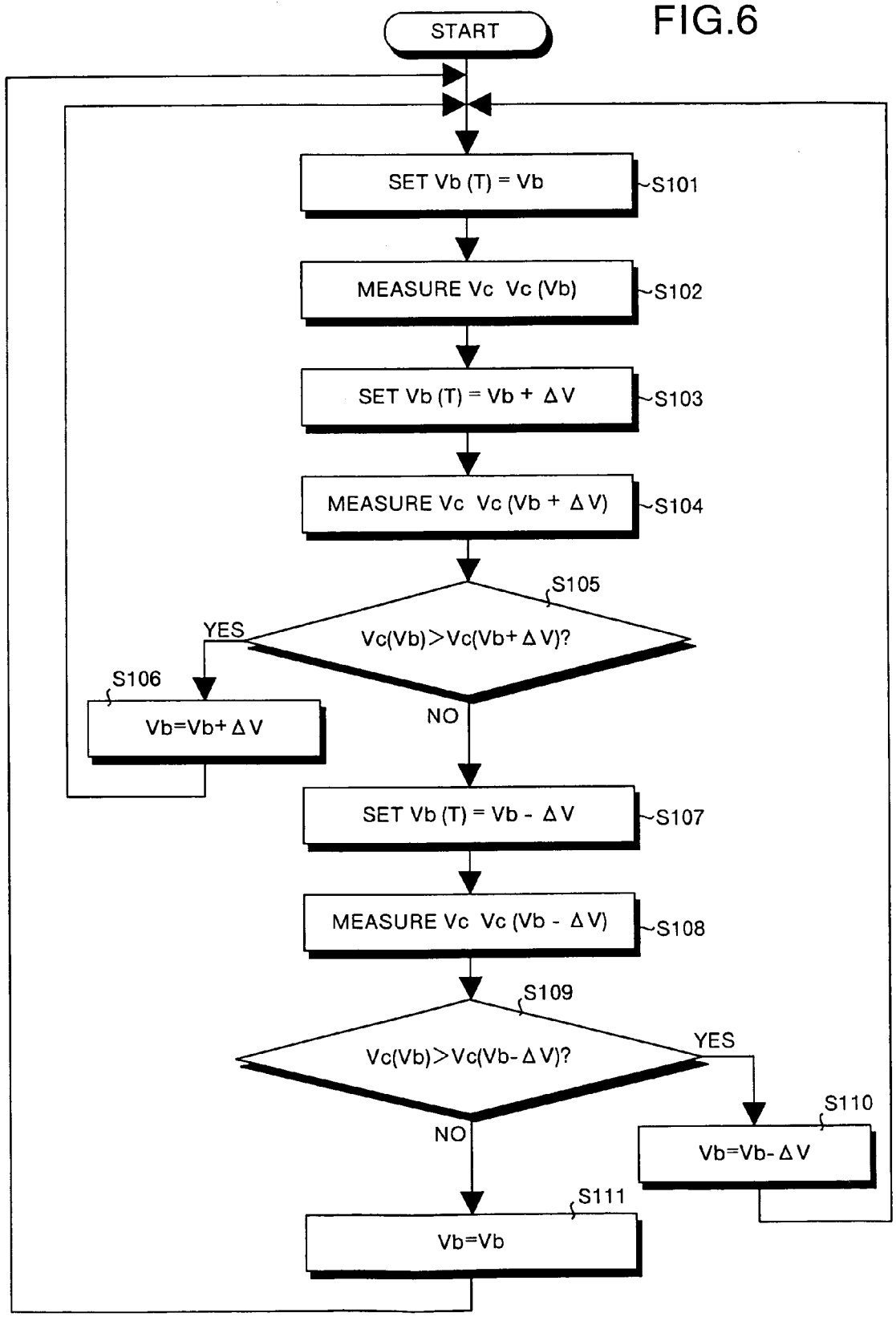
FIG. 6 is a flowchart showing a process of the generation of an error signal by the error signal generator circuit shown in FIG. 1.

FIG. 6 is a flowchart showing a process of the generation of an error signal by the error signal generator circuit 7. CPU 7b sets a bias voltage Vb (T) output from the bias voltage control circuit 10 as a bias voltage Vb, and outputs an error signal as "0" (step S101). Then, the level detector 7a measures a level value Vc (Vb) at the time of applying the bias voltage Vb (step S102).

Thereafter, the bias voltage Vb (T) is set as bias voltage Vb (T)=Vb+ΔV, that is the bias voltage Vb with a change of +ΔV. The "+ΔV" is output as an error signal (step S103). Thereafter, a level value Vc (Vb+ΔV) at the time of applying the bias voltage Vb (T)=Vb+ΔV is measured (step S104).

Then, a decision is made about whether the level value Vc (Vb) is larger than the level value Vc (Vb+ΔV) or not (step S105). When the level value Vc is larger (step S105, YES), the bias voltage Vb is set to the bias voltage (Vb +ΔV), and the "+ΔV" is output as an error signal to the bias voltage control circuit 10 (step S106). The process then proceeds to step S101.

On the other hand, when the level value Vc is not larger than the level value Vc (Vb+ΔV) (step S105, NO), the bias voltage Vb (T) is set as bias voltage Vb (T)=Vb−ΔV, that is the bias voltage Vb with a change of −ΔV. The "−ΔV" is output as an error signal (step S107). Thereafter, a level value Vc (Vb−ΔV) at the time of applying the bias voltage Vb (T)=Vb−ΔV is measured (step S108).

Then, a decision is made about whether the level value Vc (Vb) is larger than the level value Vc (Vb−ΔV) or not (step S109). When the level value Vc is larger (step S109, YES), the bias voltage Vb is set to the bias voltage (Vb−ΔV), and the "−ΔV" is output as an error signal to the bias voltage control circuit 10 (step S110). The process then proceeds to step S101. On the other hand, when the level value Vc is not larger (step S109, NO), the bias voltage Vb is set as bias voltage Vb=Vb, and "0" is output as an error signal to the bias voltage control circuit 10 (step S111) The process then proceeds to step S101. Based on this feedback control, it is possible to set the bias voltage Vb (T) close to an optimum operation point. In other words, the bias voltage is set close to the optimum operation point by minimizing a level value of the frequency fc component.

In the first embodiment, the driving signal is combined with the bias voltage at the node T1. Then, this combined signal is applied to the Mach-Zehnder optical modulator 3. However, the method is not limited to the above, and it is also possible to apply the invention to a Mach-Zehnder optical modulator for inputting the driving signal and the bias voltage from different input terminals.

Further, it is also possible to provide an optical filter at the front stage of the photodiode 6. When an unnecessary waveform component or noise component is included in the optical signal output from the light source 1, this optical filter can selectively transmit the waveform of the output optical signal component. As a result, it becomes possible to carry out a bias voltage control with high precision in total.

According to the first embodiment, the photodiode 5 detects an output optical signal of the Mach-Zehnder optical modulator 3, and converts it into an electric signal. The band pass filter 16 extracts the frequency fc component of the driving signal, and generates an error signal at an operation point of the Mach-Zehnder optical modulator 3. Then, this error signal is feedback controlled via the bias voltage control circuit 10. Therefore, it is possible to suppress the quality degradation of the output optical signal due to the drift of the operation point of the Mach-Zehnder optical modulator 3. Further, it is possible to generate a stable optical pulse string of the frequency 2 fc.

Second embodiment of this invention will be explained now. In the first embodiment, the band pass filter 16 extracts the frequency fc component of the driving signal, and the bias voltage control is carried out so that this frequency fc component becomes minimum. On the other hand, in the second embodiment, a band pass filter 26 for extracting a frequency 2 fc component that is two times the frequency fc of the driving signal is provided in place of the band pass filter 16. Then, a bias voltage control is carried out so that the frequency 2 fc component extracted by this band pass filter 26 becomes maximum.

Figure 7:
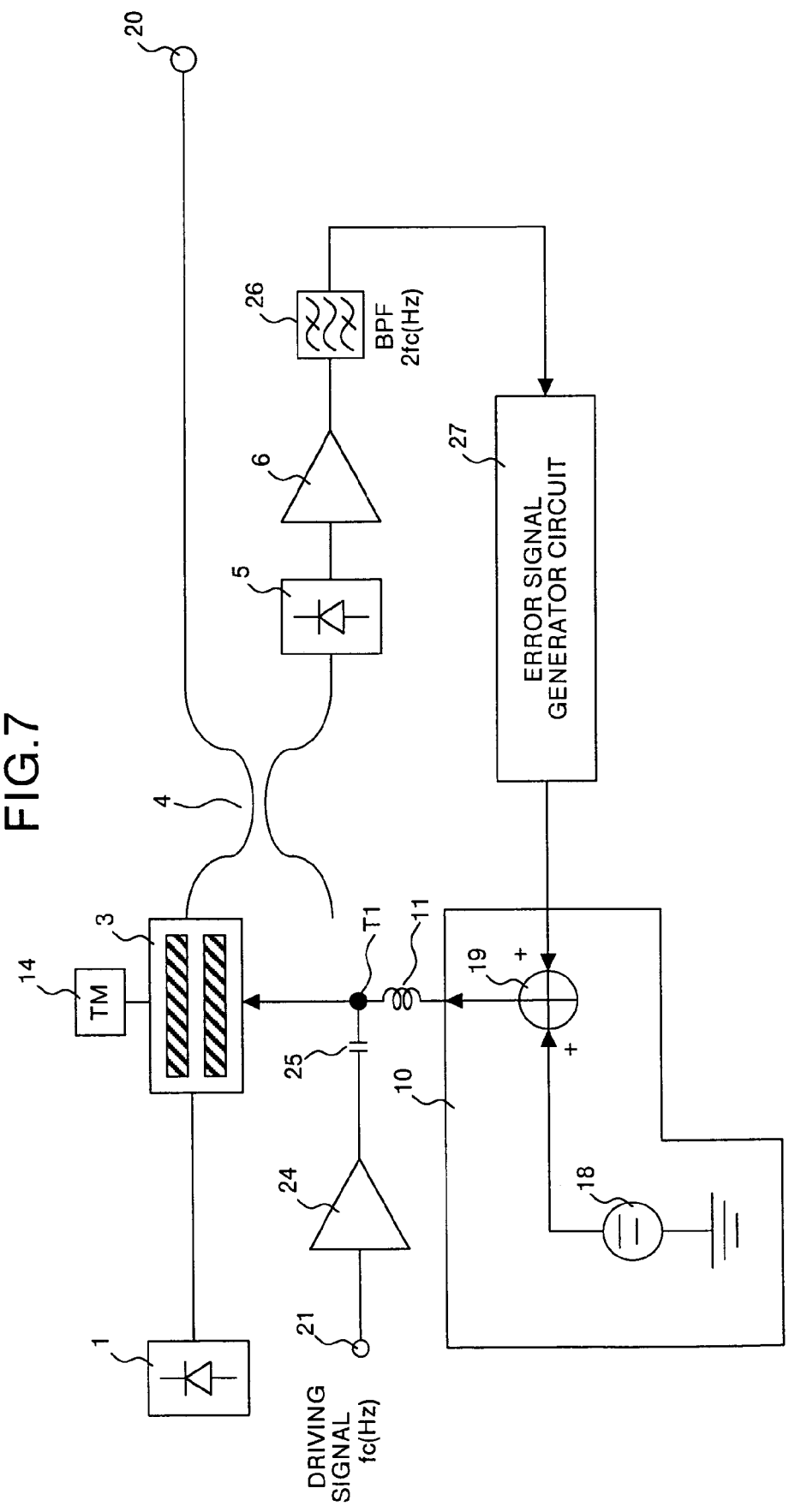
FIG. 7 is a block diagram showing a structure of an optical transmission apparatus according to a second embodiment of this invention.

FIG. 7 is a block diagram showing a structure of an optical transmission apparatus according to a second embodiment of this invention. The band pass filter 26 transmits the frequency 2 fc component that is two times the frequency fc of the driving signal, and outputs this frequency component to an error signal generator circuit 27. The error signal generator circuit 27 generates an error signal so that a level value of the frequency 2 fc component becomes maximum.

Other structures are the same as those of the first embodiment, and the identical constituent parts are attached with like reference numbers.

Figure 8:
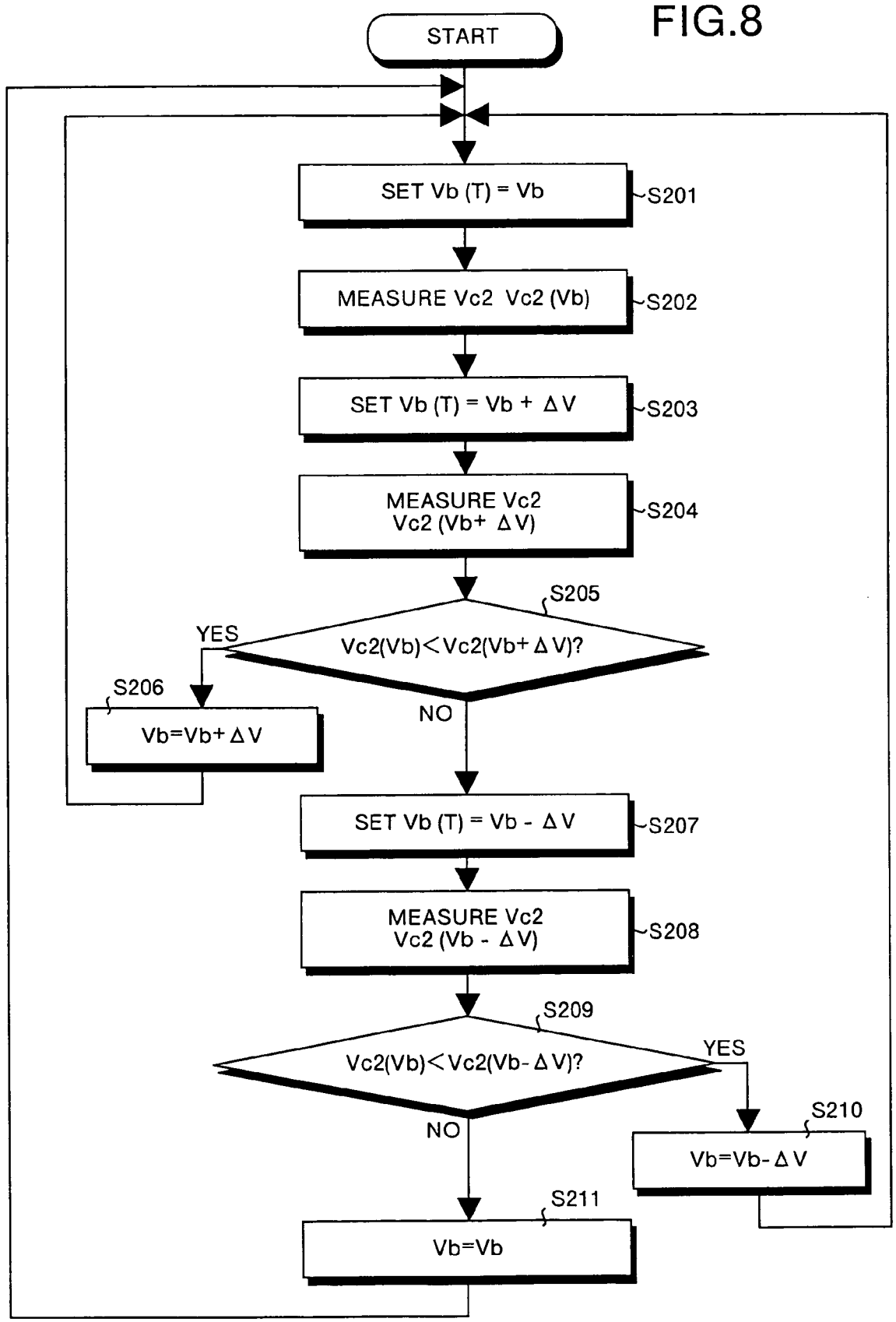
FIG. 8 is a flowchart showing a process of the generation of an error signal by the error signal generator circuit shown in FIG. 7.

Process of the generation of an error signal by the error signal generator circuit 27 will be explained below with reference to a flowchart shown in FIG. 8. The error signal generator circuit 27 sets a bias voltage Vb (T) output from the bias voltage control circuit 10 as a bias voltage Vb, and outputs an error signal as "0" (step S201). Then, a level value Vc2 (Vb) of the frequency 2 fc component at the time of applying the bias voltage Vb is measured (step S202).

Thereafter, the bias voltage Vb (T) is set as bias voltage Vb (T)=Vb+ΔV, that is the bias voltage Vb with a change of +ΔV. The "+ΔV" is output as an error signal (step S203). Thereafter, a level value Vc2 (Vb+ΔV) of the frequency 2 fc component at the time of applying the bias voltage Vb (T)=Vb+ΔV is measured (step S204).

Then, a decision is made about whether the level value Vc2 (Vb) is smaller than the level value Vc2 (Vb+ΔV) or not (step S205). When the level value Vc2 is smaller (step S205, YES), the bias voltage Vb is set to the bias voltage (Vb+ΔV), and the "+ΔV" is output as an error signal to the bias voltage control circuit 10 (step S206). The process then proceeds to step S201.

On the other hand, when the level value Vc2 is not smaller than the level value Vc2 (Vb+ΔV) (step S205, NO), the bias voltage Vb (T) is set as bias voltage Vb (T)=Vb −ΔV, that is the bias voltage Vb with a change of −ΔV. The "−ΔV" is output as an error signal (step S207). Thereafter, a level value Vc2 (Vb−ΔV) of the frequency 2 fc component at the time of applying the bias voltage Vb (T)=Vb−ΔV is measured (step S208).

Then, a decision is made about whether the level value Vc2 (Vb) is smaller than the level value Vc2 (Vb−ΔV) or not (step S209) When the level value Vc2 is smaller (step S209, YES), the bias voltage Vb is set to the bias voltage (Vb−ΔV), and the "−ΔV" is output as an error signal to the bias voltage control circuit 10 (step S210). The process then proceeds to step S201. On the other hand, when the level value Vc2 is not smaller (step S209, NO), the bias voltage Vb is set as bias voltage Vb=Vb, and "0" is output as an error signal to the bias voltage control circuit 10 (step S211). The process then proceeds to step S201. Based on this feedback control, it is possible to set the bias voltage Vb (T) close to an optimum operation point. In other words, the bias voltage is set close to the optimum operation point by maximizing a level value of the frequency 2 fc component.

According to the second embodiment, the photodiode 5 detects an output optical signal of the Mach-Zehnder optical modulator 3, and converts it into an electric signal. The band pass filter 16 extracts the frequency 2 fc component of the driving signal, and generates an error signal at an operation point of the Mach-Zehnder optical modulator 3 so that the value of the frequency 2 fc component becomes maximum. Then, this error signal is feedback controlled via the bias voltage control circuit 10. Therefore, it is possible to suppress the quality degradation of the output optical signal due to the drift of the operation point of the Mach-Zehnder optical modulator 3. Further, it is possible to generate a stable optical pulse string of the frequency 2 fc.

Third embodiment of this invention will be explained now. In the first and second embodiments, the light source 1 outputs a continuous light. This continuous light is modulated by the driving signal. On the other hand, in the third embodiment, the light source 1 outputs an optical pulse synchronous with the driving signal, and the Mach-Zehnder optical modulator 3 outputs a pulse-modulated optical signal by using the driving signal.

Figure 9:
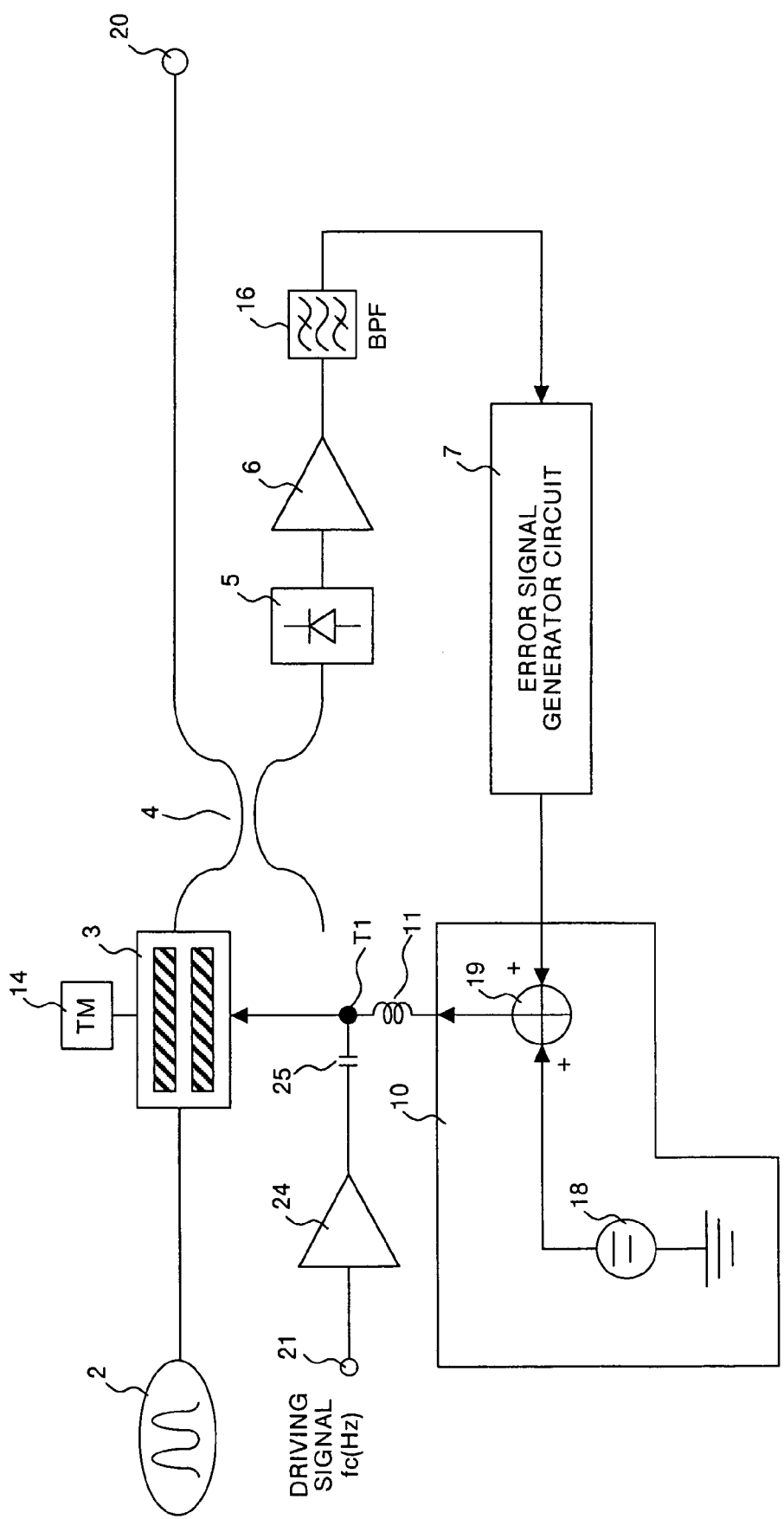
FIG. 9 is a block diagram showing a structure of an optical transmission apparatus according to a third embodiment of this invention.

FIG. 9 is a block diagram showing a structure of an optical transmission apparatus according to a third embodiment of this invention. Light source 2 is a pulse light source for outputting an optical pulse synchronous with a driving signal (a frequency fc [Hz]), and outputs, for example, an optical pulse having a bit rate two times that of the repetitive frequency fc of the driving signal. Other structures are the same as those of the first embodiment, and the identical constituent parts are attached with like reference numbers.

The light source 2 can be realized by, for example, a unit for outputting an optical pulse by gain-switching a semiconductor laser, a ring oscillator using a fiber-type optical amplifier, and a unit for modulating and outputting a continuous light in a pulse shape by a Mach-Zehnder optical modulator. In this case, an optical pulse output from the light source 2 is modulated by the Mach-Zehnder optical modulator 3. Therefore, the output optical signal output from an output terminal 20 becomes a pulse-modulated RZ signal. Accordingly, a signal detected by the photodiode 5 via the branching filter 4 also becomes an RZ signal. The band pass filter 16 transmits the repetitive frequency fc component, and outputs this transmitted signal to the error signal generator circuit 7. As a result, it is possible to carry out a bias voltage control for setting the operation point of the Mach-Zehnder optical modulator 3 close to an optimum operation point, like in the first embodiment.

According to this third embodiment, even when the optical signal input into the Mach-Zehnder optical modulator 3 is an optical pulse, it is possible to control the bias voltage of the Mach-Zehnder optical modulator 3 to an optimum operation point, so long as the repetitive frequency fc component of the driving signal is included in the output optical signal from the Mach-Zehnder optical modulator 3. At the same time, like in the first embodiment, it is possible to carry out the bias voltage control easily, even when a signal band of the modulated light becomes 10 GHz or above, and thus it becomes possible to suppress the quality degradation of the output optical signal due to a distortion in the waveform of the driving signal.

Fourth embodiment of this invention will be explained now. In the first to third embodiments, each of the light sources 1 and 2 is one single-wavelength light source. On the other hand, in the fourth embodiment, lights from a plurality of single-wavelength light sources are applied to the Mach-Zehnder optical modulator 3, and the Mach-Zehnder optical modulator 3 collectively modulates and outputs optical signals from these single-wavelength light sources.

Figure 10:
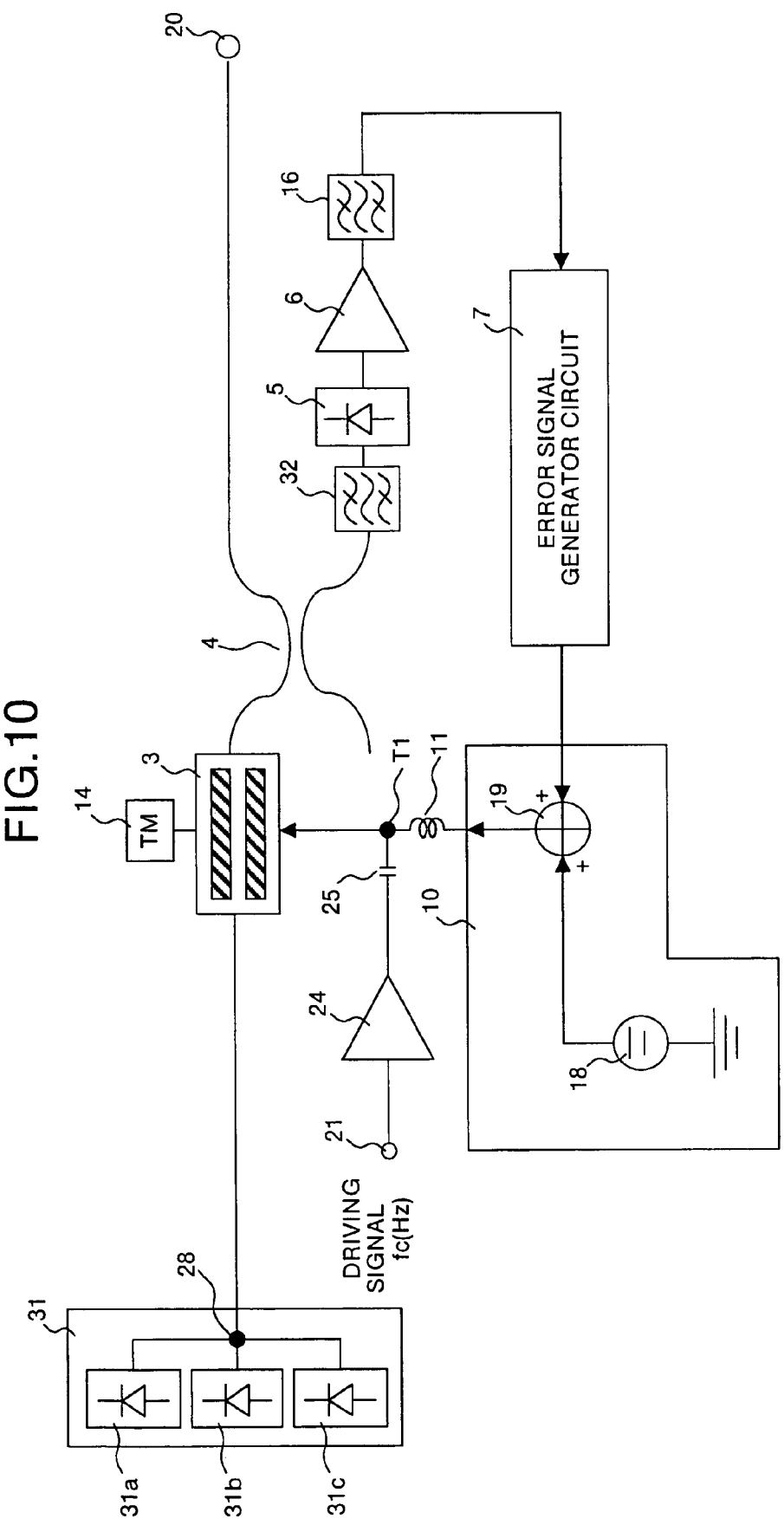
FIG. 10 is a block diagram showing a structure of an optical transmission apparatus according to a fourth embodiment of this invention.

FIG. 10 is a block diagram showing a structure of an optical transmission apparatus according to a fourth embodiment of this invention. Light source 31 is provided in place of the light source 1 shown in the first embodiment. The light source 31 has three different single-wavelength light sources 31a to 31c. Optical signals from the single-wavelength light sources 31a to 31c are output to the Mach-Zehnder optical modulator 3 via a photo coupler 28. An optical filter 32 is provided between the branching filter 4 and the photodiode 5. The optical filter 32 selectively transmits any one of wavelengths of the single-wavelength light sources 31a to 31c. Other structures are the same as those of the first embodiment, and the identical constituent parts are attached with like reference numbers.

The optical signals from the single-wavelength light sources 31a to 31c input into the Mach-Zehnder optical modulator 3 are collectively modulated by the driving signal. The optical filter 32 selects a wavelength light of any one of the single-wavelength light sources 31a to 31c. The band pass filter 16 extracts the frequency fc component of the driving signal for the selected wavelength light. Thus, it is possible to collectively control the bias voltages of the single-wavelength light sources 31a to 31c. When the single-wavelength light sources 31a to 31c are turned ON/OFF based on time, the transmission wavelength of the optical filter 32 can be controlled by matching the output wavelength of any one of the single-wavelength light sources 31a to 31c that is in the ON status.

According to this fourth embodiment, in the case of the optical transmission apparatus for collectively modulating and outputting wavelength-multiple lights, the optical filter 32 selectively transmits any one single-wavelength light of the wavelength lights output by the single-wavelength light sources 31a to 31c. The frequency fc component of the driving signal of the transmitted signal is extracted. Then, a bias voltage control is carried out to minimize this frequency fc component. Based on this, it is possible to set the bias voltage of the Mach-Zehnder optical modulator 3 for collectively modulating the wavelength-multiple lights close to an optimum operation point. As a result, it is possible to suppress the quality degradation of the output optical signal due to a distortion in the waveform of the driving signal, like in the first embodiment.

Fifth embodiment of this invention will be explained now. In the first to fourth embodiments, the frequency fc component or the frequency 2 fc component of the driving signal is extracted, and a feedback control is carried out to minimize or maximize this level value. Based on this, a bias voltage control is carried out to set the operation point of the Mach-Zehnder optical modulator 3 close to an optimum operation point. On the other hand, in the fifth embodiment, a low-frequency component like a dither signal is superimposed with a bias voltage. Then, a bias voltage control is carried out by a synchronous detection.

Figure 11:
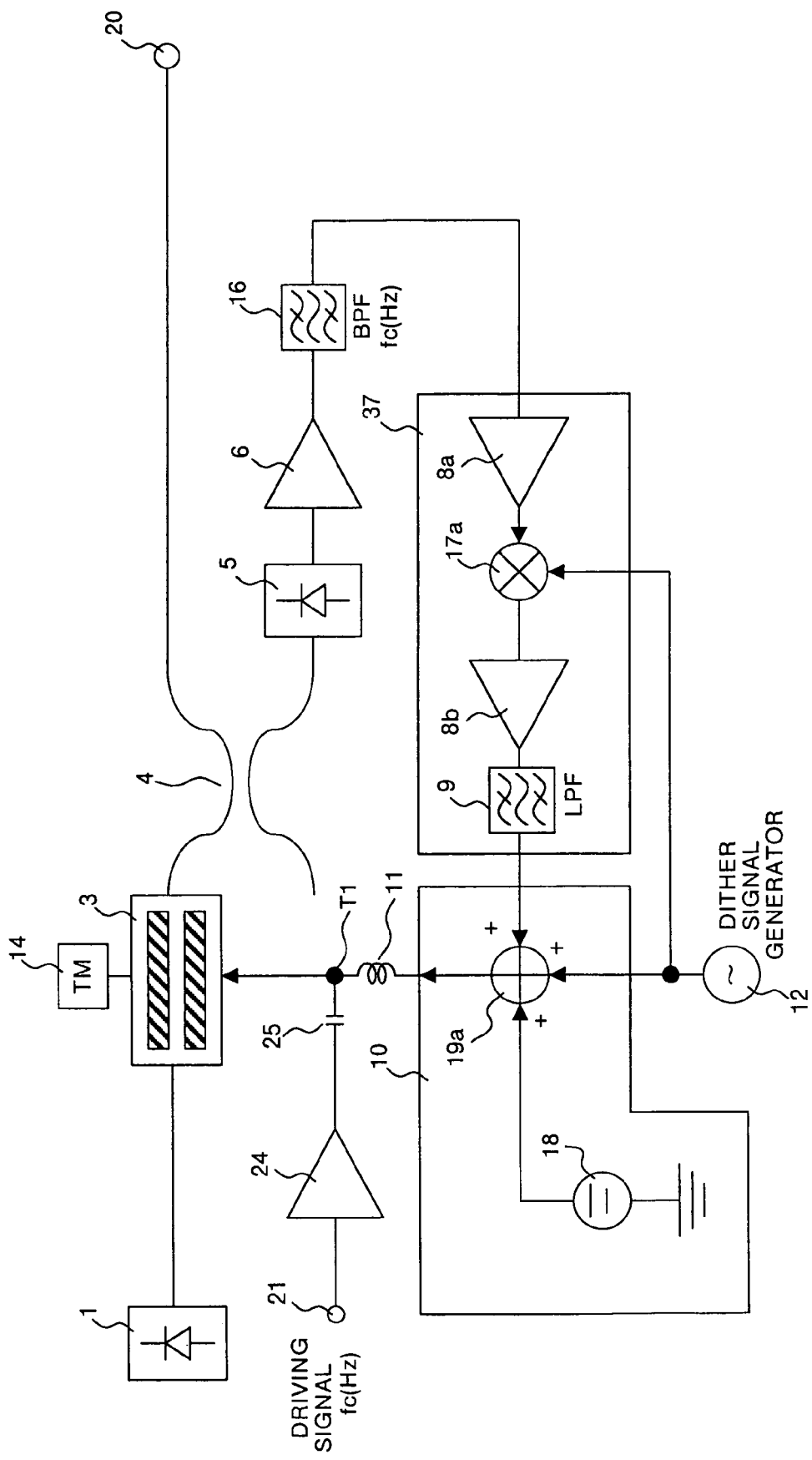
FIG. 11 is a block diagram showing a structure of an optical transmission apparatus according to a fifth embodiment of this invention.
Figure 12:
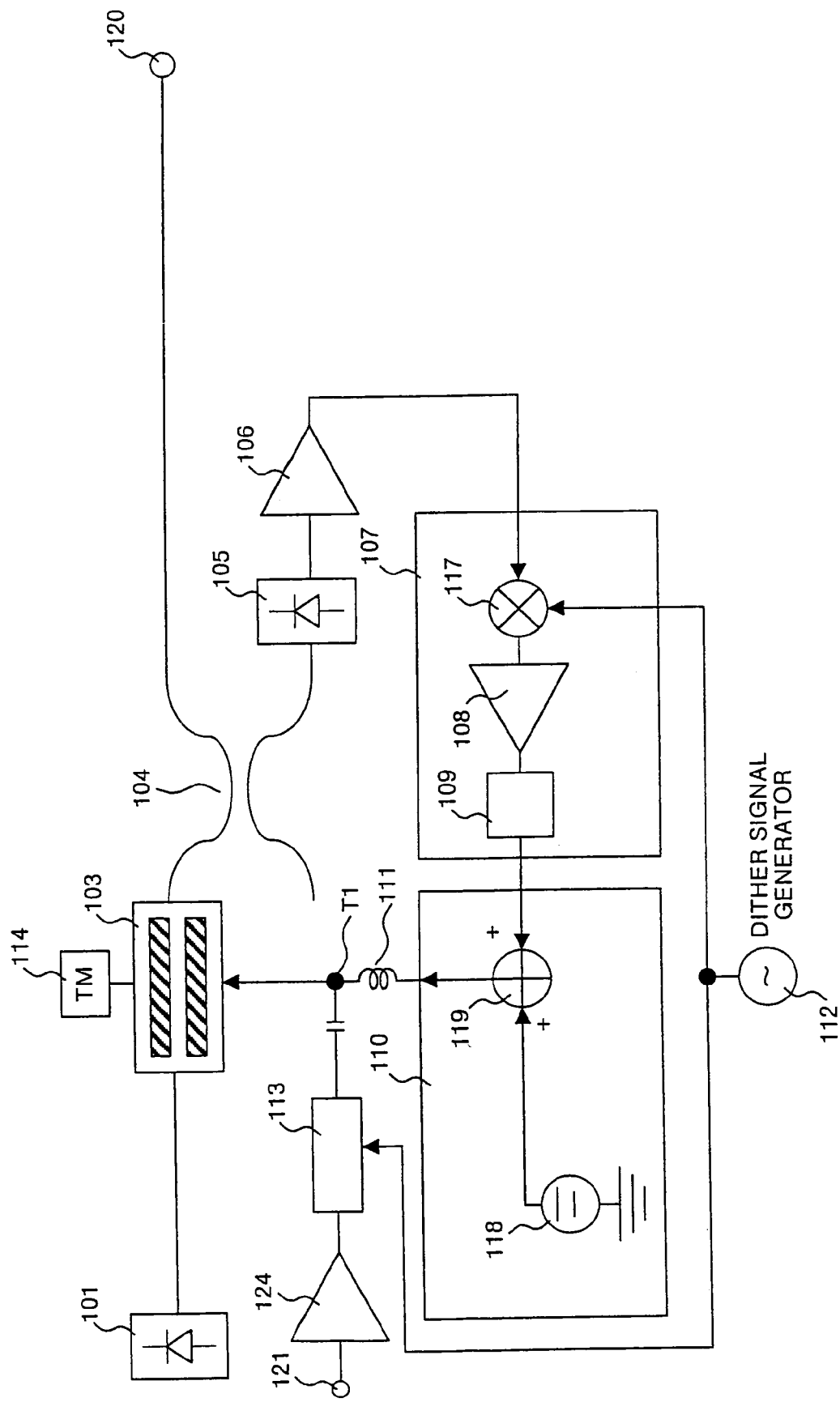
FIG. 12 is a block diagram showing a structure of a conventional optical transmission apparatus.
Figure 13:
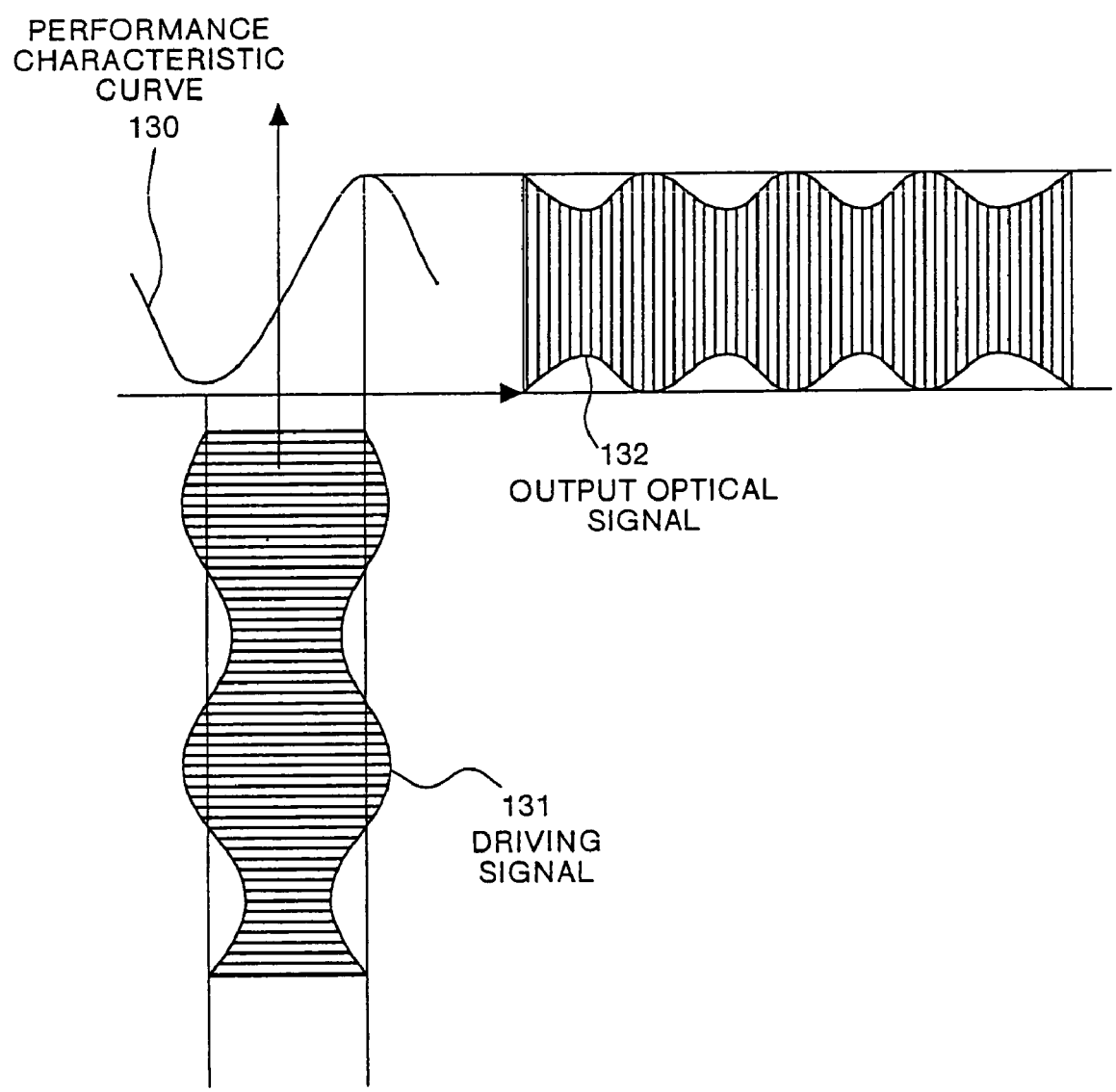
FIG. 13 is a diagram for explaining a modulation operation of a Mach-Zehnder optical modulator when a bias voltage of a Mach-Zehnder optical modulator shown in FIG. 12 is at a proper value.
Figure 14:
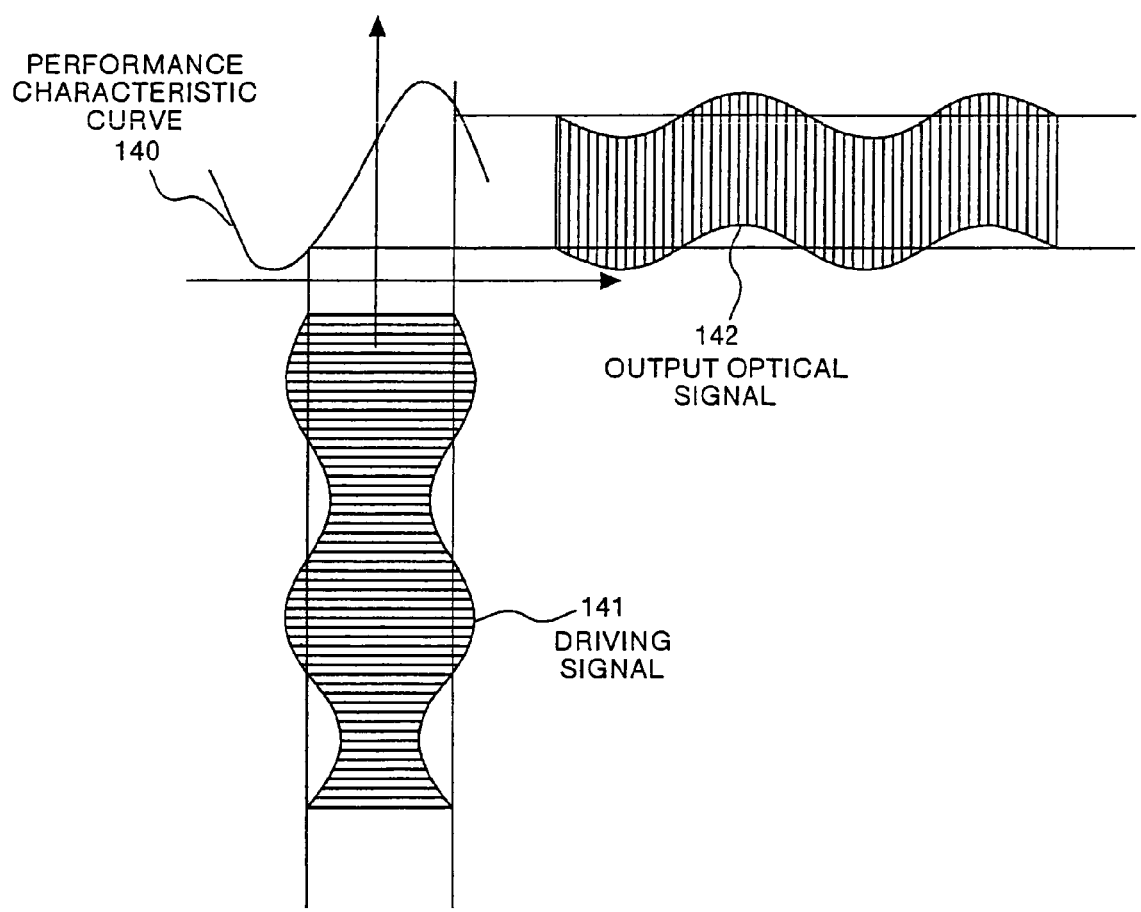
FIG. 14 is a diagram for explaining a modulation operation of a Mach-Zehnder optical modulator when a bias voltage of the Mach-Zehnder optical modulator shown in FIG. 12 is at a value slightly higher than a proper value.
Figure 15:
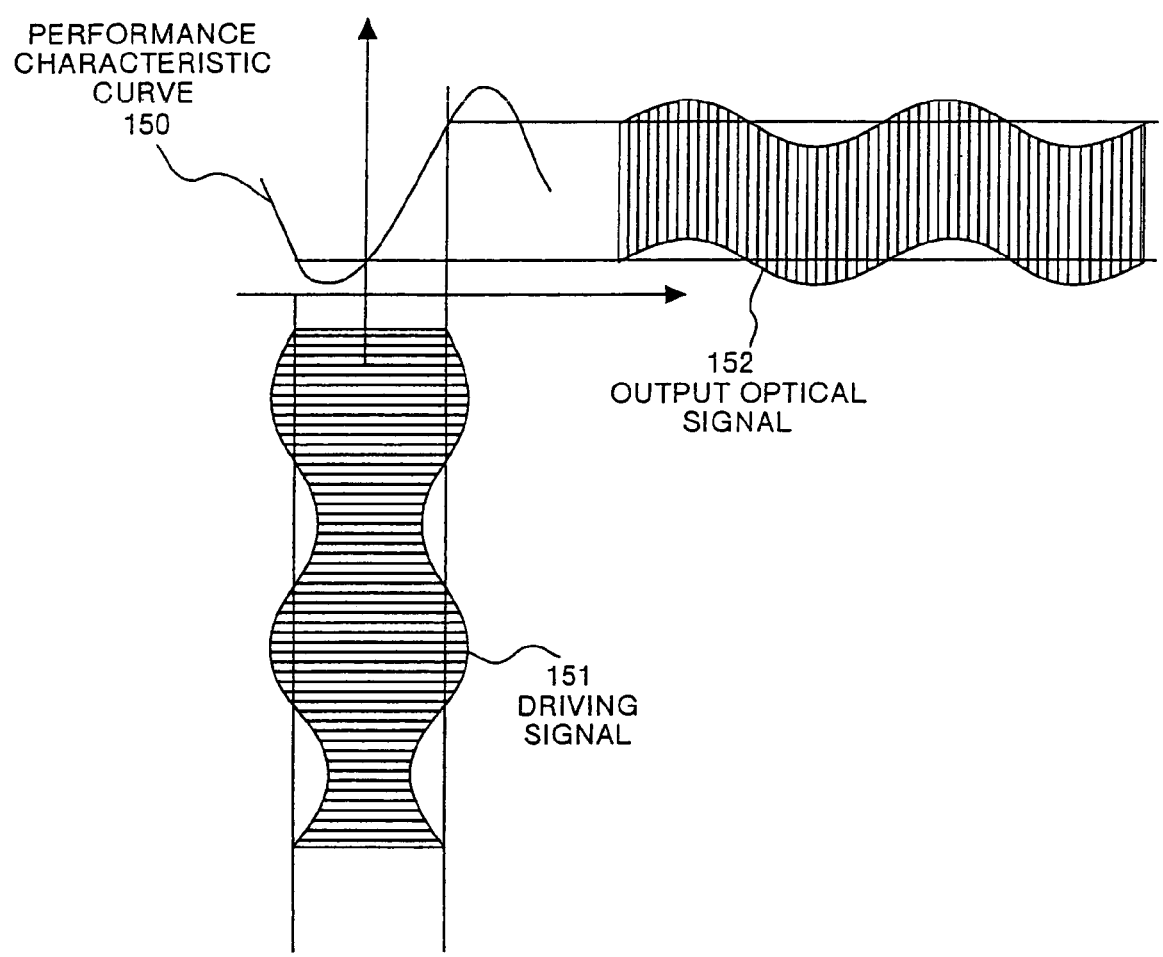
FIG. 15 is a diagram for explaining a modulation operation of a Mach-Zehnder optical modulator when a bias voltage of the Mach-Zehnder optical modulator shown in FIG. 12 is at a value slightly lower than a proper value.

FIG. 11 is a block diagram showing a structure of an optical transmission apparatus according to the fifth embodiment of this invention. Error signal generator circuit 37 for carrying out a synchronous detection is provided in place of the error signal generator circuit 7, and a dither signal generator 12 is further provided. A dither signal output from the dither signal generator 12 is input into the error signal generator circuit 37 and to the bias voltage control circuit 10. Other structures are the same as those of the first embodiment, and the identical constituent parts are attached with like reference numbers.

The error signal generator circuit 37 amplifies by an amplifier 8a a signal of the frequency fc component output from the band pass filter 16, and mixes this amplified signal with a dither signal by a mixer 17a, thereby carrying out a synchronous detection. This mixed signal is amplified by an amplifier 8b, and a low-frequency component is output as an error signal to an adder 19a of the bias voltage control circuit 10 via a low-pass filter 9.

The adder 19a of the bias voltage control circuit 10 adds the error signal to the bias voltage output from the DC power source 18, and superimposes a dither signal. The adder 19a then outputs this superimposed bias voltage to the Mach-Zehnder optical modulator 3 via the inductor 11 and the node T1.

As explained above, the error signal generator circuit 37 carries out a synchronous detection of the frequency fc output from the bias voltage control circuit 10 by using the frequency f component of the dither signal. Based on a result of this synchronous detection, an error signal including an optimum operation direction of the Mach-Zehnder optical modulator is automatically generated.

The amplifiers 8a and 8b can be structured using operational amplifiers. It is preferable that the amplifier 8a is realized using a linear amplifier. Further, it is preferable that the photodiode 5 can receive the frequency fc component of the driving signal, and that the preamplifier 6 has a sufficient band capable of amplifying the frequency fc component of the driving signal.

There occurs no quality degradation of the output optical signal when the amplitude of the dither signal superimposed by the adder 9a is set to a few % or below of the driving signal. Further, it is possible to obtain an error signal without an influence of a variation in the intensity of the optical signal output from the light source 1, when the error signal generator circuit 37 includes the band pass filter 16 and the amplifier 8a realized by the linear amplifier.

According to this fifth embodiment, the frequency fc component of the driving signal superimposed with the dither signal is extracted. Then, this frequency fc component is detected in synchronism with the dither signal. Therefore, it is possible to generate an error signal including an optimum operation point direction of the Mach-Zehnder optical modulator 3. As a result, it is possible to suppress the quality degradation of the output optical signal due to a distortion in the waveform of the driving signal, like in the first embodiment.

According to this invention, it is possible to carry out a bias voltage control without providing a structure for superimposing a low-frequency signal like a dither signal with the driving signal. Further, it is possible to carry out the bias voltage control easily even when a signal band of the modulation light becomes 10 GHz or above. As a result, there is an effect that it is possible to suppress the quality degradation of an output optical signal due to a distortion in the waveform of the driving signal.

Furthermore, even when the optical signal input into the optical modulator is an optical pulse, it is possible to carry out a bias voltage control without providing a structure for superimposing a low-frequency signal like a dither signal with the driving signal. Further, it is possible to carry out the bias voltage control easily even when a signal band of the modulation light becomes 10 GHz or above. As a result, there is an effect that it is possible to suppress the quality degradation of an output optical signal due to a distortion in the waveform of the driving signal.

Furthermore, it is possible to control the operation point of the optical modulator to an optimum operation point even when a multiple-wavelength lights are collectively modulated and output when a signal band of the modulation light is 10 GHz or above.

Furthermore, it becomes possible to automatically generate an error signal including a direction of a bias voltage control. Further, it is possible to carry out the bias voltage control easily even when a signal band of the modulation light becomes 10 GHz or above. As a result, there is an effect that it is possible to suppress the quality degradation of an output optical signal due to a distortion in the waveform of the driving signal.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transmission apparatus for transmitting an optical pulse string having a frequency two times that of a driving signal (fc), said optical transmission apparatus comprising:
    a Mach-Zehnder optical modulator;
    a light source which inputs an optical signal into said optical modulator;
    a driving unit which inputs the driving signal into the optical modulator;
    a converting unit which receives a frequency component of the driving signal (fc), takes out a part of an optical signal output from said optical modulator and converts that part of the optical signal into electric signal;
    an extracting unit connected to the converting unit, the extracting unit extracting a frequency component of the driving signal (fc) included in the electric signal converted by said converting unit;
    an error signal generating unit which includes a level detector for detecting a level of the frequency component of the driving signal (fc) and a processing unit connected to said level detector receiving said frequency component and generating an error signal based on the level detected by the level detector, the generated error signal being output to a digital to analog converter connected to the processing unit which converts the error signal from a digital error signal to an analog error signal the error signal generating unit generating an error signal of a bias voltage for minimizing a value of a frequency component of the driving signal (fc) extracted by said extracting unit; and
    a bias voltage control unit which applies a summed bias voltage obtained as a result of addition of the bias voltage and a voltage corresponding to the analog error signal to said optical modulator.

2. The optical transmission apparatus according to claim 1, wherein
    said light source generates a modulated optical pulse synchronous with the driving signal and having a bit rate two times that of the driving signal, and supplies the optical pulse to said optical modulator, and
    said optical modulator pulse modulates the optical pulse with the driving signal and outputs the modulated optical pulse.

3. The optical transmission apparatus according to claim 1, wherein said light source includes a plurality of single-wavelength light sources each of which emits light having a different single-wavelength,
    said optical transmission apparatus further comprising an optical filter, provided at the front stage of said converting unit, which transmits light having only a desired wavelength out of the lights having different wavelengths emitted by said single-wavelength light sources that constitute an optical signal output from said optical modulator.

4. An optical transmission apparatus for transmitting an optical pulse string having a frequency two times that of a driving signal (fc), said optical transmission apparatus comprising:
    a Mach-Zehnder optical modulator;
    a light source which inputs an optical signal into said optical modulator;
    a driving unit which inputs the driving signal into said optical modulator;
    a converting unit which receives a frequency component of the driving signal (fc), takes out a part of an optical signal output from said optical modulator and converts that part of the optical signal into electric signal;

an extracting unit which connected to the converting unit, the extracting unit extracting a frequency component two times that of the driving signal (fc) included in the electric signal converted by said converting unit;

an error signal generating unit which includes a level detector for detecting a level of the frequency component of the driving signal (fc) and a processing unit connected to said level detector receiving said freguency component and generating an error signal based on the level detected by the level detector, the generated error signal being output to a digital to analog converter connected to the processing unit which converts the error signal from a digital error signal to an analog error signal the error signal generating unit generating an error signal of a bias voltage for maximizing a value of the frequency component two times that of the driving signal (fc) extracted by said extracting unit; and a bias voltage control unit which applies a summed bias voltage added with the analog error signal of the bias voltage to said optical modulator.

5. The optical transmission apparatus according to claim 4, wherein said light source generates a modulated optical pulse synchronous with the driving signal and having a bit rate two times that of the driving signal, and supplies the optical pulse to said optical modulator, and said optical modulator pulse modulates the optical pulse with the driving signal and outputs the modulated optical pulse.

6. The optical transmission apparatus according to claim 4, wherein said light source includes a plurality of single-wavelength light sources each of which emits light having a different single-wavelength, said optical transmission apparatus further comprising an optical filter, provided at the front stage of said converting unit, which transmits light having only a desired wavelength out of the lights having different wavelengths emitted by said single-wavelength light sources that constitute an optical signal output from said optical modulator.

7. A bias voltage control method for an optical modulator to be used for an optical transmission apparatus that inputs an optical signal into a Mach-Zehnder optical modulator, applies a driving signal and a summed bias voltage to said optical modulator, and transmits an optical pulse string having a frequency two times that of the driving signal, the method comprising:

receiving a frequency component of the driving signal (fc);

taking out a part of an optical signal output from said optical modulator and converting that part of the optical signal into an electric signal;

extracting a frequency component of the driving signal from the obtained electric signal;

detecting, by a level detector, a level of the frequency component of the driving signal (fc);

generating, by a processing unit connected to the level detector, an error signal of a bias voltage based on the level detected for minimizing a value of the frequency component of the driving signal, the generated error signal being output to a digital to analog converter connected to the processing unit which converts the error signal from a digital error signal to an analog error signal; and applying a summed bias voltage obtained as a result of addition of the bias voltage and a voltage corresponding to the analog error signal to said optical modulator.

8. A bias voltage control method for an optical modulator to be used for an optical transmission apparatus that inputs an optical signal into a Mach-Zehnder optical modulator, applies a driving signal and a bias voltage to said optical modulator, and transmits an optical pulse string having a frequency two times that of the driving signal, the method comprising: receiving a frequency component of the driving signal (fc);

taking out a part of an optical signal output from said optical modulator and converting that part of the optical signal into electric signal;

extracting a frequency component two times that of the driving signal from the obtained electric signal;

detecting, by a level detector, a level of the frequency component of the driving signal (fc);

generating, by a processing unit connected to the level detector, an error signal of a bias voltage based on the level detected for maximizing a value of the frequency component two times that of the driving signal, the generated error signal being output to a digital to analog converter connected to the processing unit which converts the error signal from a digital error signal to an analog error signal; and applying a bias voltage, added with a voltage corresponding to the analog error signal, to said optical modulator.

9. A method of making an optical transmission apparatus, comprising:

providing an optical modulator to output an optical signal;

providing a first signal generator to generate a driving signal for said optical modulator said driving signal including a frequency component; and providing a second signal generator to generate an error signal, the second signal generator including a level detector for detecting a level of the frequency component and a processor connected to said level detector receiving said freguency component and generating an error signal based on the level detected by the level detector, said error signal being generated from the frequency component satisfying a predetermined threshold to generate a digital detection signal which is converted to an analog signal, by a digital to analog converter connected to said processor, indicating a change in a bias voltage to be input to said optical modulator;

providing a controller to generate the bias voltage, said bias voltage being generated from combining said error signal with a predetermined bias voltage;

wherein said bias voltage and said driving signal are input to drive the optical modulator.

10. The method of claim 9, wherein said providing an optical modulator includes providing the optical modulator to output an optical signal with a frequency two times greater than the value of the frequency component of the driving signal.

11. The method of claim 9, wherein said providing a second signal generator includes providing the second signal generator to generate an error signal to minimize the value of the frequency component of the driving signal.

12. The method of claim 9, wherein said providing a second signal generator includes providing the second signal generator to generate an error signal to maximize the value of two times said frequency component of the driving signal.

* * * * *